United States Patent
Raghunathan et al.

(10) Patent No.: US 10,750,413 B1
(45) Date of Patent: Aug. 18, 2020

(54) CONTROLLED TRANSITION FROM DUAL-CONNECTIVITY TO SINGLE-CONNECTIVITY

(71) Applicant: Sprint Spectrum L.P., Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/130,181

(22) Filed: Sep. 13, 2018

(51) Int. Cl.
*H04W 36/00* (2009.01)
*H04W 76/27* (2018.01)
*H04L 1/00* (2006.01)
*H04W 36/30* (2009.01)
*H04W 88/10* (2009.01)
*H04W 76/34* (2018.01)

(52) U.S. Cl.
CPC ....... *H04W 36/0027* (2013.01); *H04L 1/0026* (2013.01); *H04W 36/30* (2013.01); *H04W 76/27* (2018.02); *H04W 76/34* (2018.02); *H04W 88/10* (2013.01)

(58) Field of Classification Search
CPC .................... H04W 72/1289; H04W 48/20
See application file for complete search history.

(56) References Cited

U.S. PATENT DOCUMENTS

| | | | | |
|---|---|---|---|---|
| 2015/0049681 A1* | 2/2015 | Huang | ............... | H04W 72/1289 370/329 |
| 2015/0085829 A1* | 3/2015 | Bawaskar | ............. | H04W 36/26 370/332 |
| 2015/0223095 A1* | 8/2015 | Centonza | .......... | H04W 36/0088 455/67.11 |
| 2016/0057800 A1* | 2/2016 | Ingale | ............... | H04W 56/0005 370/216 |
| 2018/0062800 A1* | 3/2018 | Chandramouli | .. | H04W 72/0433 |

* cited by examiner

*Primary Examiner* — Melanie Jagannathan (57) ABSTRACT

Disclosed are methods and systems for configuring service of a user equipment device (UE). When the UE has dual-connectivity service, such as EN-DC service, poor quality on one of the UE's air-interface connections could result in transition of the UE to single-connectivity service. To address technological issues that may arise in this process, one of the UE's serving Node-Bs (NBs) could control teardown of an access bearer homed to the other of the UE's serving NBs. Further or alternatively, a control-plane signaling path that is homed to one of the UE's serving NBs could be replaced with a control-plane signaling path instead homed to the other of the UE's serving NBs. In addition, in appropriate circumstances, when such reconfiguration occurs, service of the UE could be switched from one core network to another.

20 Claims, 8 Drawing Sheets

CONTROLLED TRANSITION FROM DUAL-CONNECTIVITY TO SINGLE-CONNECTIVITY

BACKGROUND

A cellular wireless network typically includes a number of base stations or other access nodes, referred to without limitation as Node-Bs (NBs), that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated) can operate. Each NB could be coupled with a core network that provides connectivity with various application servers and/or transport networks, such as the public switched telephone network (PSTN) and/or the Internet for instance. With this arrangement, a UE within coverage of the cellular network could engage in air interface communication with a NB and could thereby communicate via the NB with various application servers and other entities.

Such a network could operate in accordance with a particular radio access technology, with communications from the NBs to UEs defining a downlink or forward link and communications from the UEs to the NBs defining an uplink or reverse link.

In accordance with the radio access technology, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the NBs and UEs.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

OVERVIEW

In a representative arrangement, the core network with which a NB is connected includes a user-plane subsystem, such as a Serving Gateway (SGW) and Packet Data Network Gateway (PGW), or a User Plane Function (UPF), that provide connectivity with a transport network such as the Internet. Further, the representative core network includes a control-plane subsystem, such as a Mobility Management Entity (MME), or Access and Mobility Management Function (AMF) and Session Management Function (SMF).

When a UE enters into coverage of such a system, the UE could detect threshold strong coverage of a NB (e.g., a threshold strong reference signal broadcast by the NB). In turn, the UE and NB could then engage in control signaling (e.g., pursuant to the Radio Resource Control (RRC) protocol) to establish an air-interface connection (e.g., an RRC connection) through which the NB will serve the UE. And the NB could establish for the UE a context record indicating an identity of the established air-interface connection.

Further, if the UE is not already registered for service with the core network, the UE could transmit to the NB an attach request, which the NB could forward to a core network control-plane node (e.g., MME or AMF/SMF) for processing. In response to the UE's attach request, the control node could then authenticate the UE and establish for the UE a context record indicating that the UE is served by the NB, thus effectively establishing for the UE a control-plane signaling path tied or homed to that NB. Moreover, the control-plane node could responsively engage in signaling with the NB and with a core-network user-plane node (e.g., SGW or UPF), to coordinate establishment for the UE of a user-plane access bearer that extends through the core network from the NB to a user-plane node (e.g., PGW or UPF), and the user-plane node could similarly establish for the UE a context record identifying the UE's established access bearer.

Once the UE is connected and registered with the network, the NB could then serve the UE in a connected mode, managing downlink communication of packet data to the UE and uplink communication of packet data from the UE. For example, when packet data for the UE arrives at the core network from a transport network, the data could flow over the UE's established access bearer to the NB, and the NB could then schedule and provide transmission of that data over the UE's air-interface connection to the UE. Likewise, when the UE has data to transmit on the transport network, the UE could transmit a scheduling request to the NB, the NB could responsively schedule transmission of that data from the UE, the UE could accordingly transmit the data to the NB, and the NB could forward the data along the UE's access bearer for output onto the transport network.

In addition, when the UE is served by a NB, the UE may regularly evaluate the quality of its communication channel with the NB and provide the NB with channel-quality reports each specifying a channel quality indicator (CQI) value that represents a latest determined channel quality. The UE could determine channel quality based on various factors, such as but not limited to downlink signal-to-noise ratio. Further, an example system could define a range of CQI values from a lowest value representing poorest channel quality to a highest value representing the best channel quality. Based on the UE's evaluation, the UE could thus select an appropriate CQI value and transmit that value in a CQI report (e.g., through RRC signaling) to the NB.

The NB could then make use of a UE's reported CQI value as a basis to set a modulation and coding scheme (MCS) to be used for data transmissions over the air between the NB and the UE. For instance, the NB could apply a standard mapping table that maps various CQI values to associated MCS settings (e.g., modulation scheme and coding rate), designed to help minimize block error rate (BLER). Higher CQI could map to higher-order MCS, which could allow transmission of more bits of data per physical air interface resource (e.g., per subcarrier). Whereas, lower CQI could map to lower-order MCS, which could allow for transmission of fewer bits per physical air interface resource.

As the industry advances from one generation of wireless technology to the next, UEs may need to support simultaneous connections on multiple radio access technologies. With the transition from 4G to 5G, for instance, it is expected that UEs will be configured to support use of both technologies concurrently, with an arrangement referred to as EUTRA-NR Dual Connectivity (EN-DC). With such an arrangement, a UE might include both a 4G radio and a 5G radio, and the 4G radio could be served by a 4G NB (e.g., an evolved-Node-B or eNB) concurrently with the 5G radio being served by a 5G NB (e.g., a gigabit-Node-B or gNB). This arrangement could help support transition from 4G technology to 5G technology and may provide other benefits as well. More generally, dual connectivity could encompass service on two or more radio access technologies concurrently, to facilitate technology transitions or for other purposes.

In a dual-connectivity scenario, where a UE is concurrently connected with two NBs, one of the NBs could operate as a master-NB, and the other NB could operate as a slave-NB. With such an arrangement, each NB could have a separate established access bearer for the UE. (For instance, in a "split-bearer" arrangement, separate access bearers could split off from a user-plane node such as an SGW or UPF, with one bearer homed to one NB and the other bearer homed to the other NB. Alternatively, a single access bearer could be homed to just one of the NBs, and that bearer could be split from that NB to extend via an inter-NB interface to the other NB.) But a control-plane for both of the UE's connections might be homed to just the master-NB.

To configure dual-connectivity, the UE might first connect with one NB, so that a control-plane homed to that NB would be established, and an access bearer homed to the NB would also be established. That NB could then operate as a master-NB to coordinate setup of a second, concurrently-existing air-interface connection with an associated access bearer with respect to another NB as slave-NB.

For instance, once single-connectivity is established for the UE, the UE's serving NB operating as a master-NB could direct the UE to scan for secondary coverage of a NB on another radio access technology. (For example, if the UE is initially connected with a 4G NB, that NB might direct the UE to scan for coverage of a 5G NB, or vice versa.) Upon receiving the UE's report of such detected coverage, the master-NB could then engage in signaling with the UE and that other NB, to coordinate establishment of a secondary air-interface connection between the UE and the other NB as slave-NB. Further the slave-NB could establish for the UE a context record indicating an identity of its established air-interface connection with the UE.

In addition, the master-NB could engage in signaling over its control-plane signaling path with a core network control-plane node (e.g., MME or AMF/SMF), to trigger establishment for the UE of an access bearer homed to the slave-NB. And the control-plane node could engage in signaling with the slave-NB (e.g., via the control-plane signaling path homed to the master-NB, and via inter-NB signaling between the master-NB and the slave-NB) and with a core-network user-plane node (e.g., SGW or UPF), to coordinate establishment for the UE of a user-plane access bearer that extends through the core network from the slave-NB to a user-plane node (e.g., PGW or UPF). Further, the control-node, user-plane node, and NBs could update their UE context records accordingly.

With dual-connectivity so configured, each NB could serve the UE over its respective air-interface connection with the UE. For instance, when the core network receives data destined to the UE, some of the data could pass over one of the UE's access bearers to the master-NB and other of the data could pass over the UE's other access bearer to the slave-NB. The master-NB could thus schedule and provide transmission to the UE of the portion of the data that it received for transmission to the UE. And the slave-NB could likewise schedule and provide transmission to the UE of the portion of the data that it received for transmission to the UE. Similarly, when the UE has data to transmit, each NB could coordinate uplink transmission of a portion of the data and could forward that portion of the data over the UE's access bearer homed to that NB for output onto the transport network.

In the dual-connectivity scenario, the UE may also regularly evaluate the quality of each of its communication channels and may provide respective CQI reports to each of its serving NBs, which the NBs could use as described above to set MCS for their respective communications with the UE. For instance, the UE could regularly evaluate quality of its connection with the master-NB and provide associated CQI reports to the master-NB, which the master-NB could use as a basis to set MCS for data communication over its air-interface connection with the UE. And the UE could also regularly evaluate quality of its connection with the slave-NB and provide associated CQI reports to the slave-NB, which the slave-NB could use as a basis to set MCS for data communication over its air-interface connection with the UE.

When reported channel quality on one of the UE's air-interface connections is poor (e.g., when the UE's reported CQI is relatively low) but sufficient, the associated NB may still continue to provide the UE with service on that air-interface connection.

The relatively poor channel quality, however, could pose some issues.

For example, low CQI could map to a low-order MCS as noted above. But applying a low-order MCS could result in low spectral efficiency (requiring a greater amount of radio frequency (RF) spectrum to facilitate given data communication), and low spectral efficiency could unfortunately lead to the wireless service provider needing to add more costly RF spectrum in order satisfy subscriber demand. Further, communication with a low-order MCS could result in the UE's transceiver being active for a longer time in order to facilitate given data communication, and that could result in increased battery consumption and user-experience problems. And still further, communication with a low-order MCS could result in low data-transmissions rates, which could be problematic for latency-sensitive or heavy-data communications.

According to the present disclosure, one way to help address these issues is to respond to threshold low CQI (i.e., poor channel quality) on one of a UE's connections by transitioning the UE from a dual-connectivity service configuration to a single-connectivity service connection. In particular, when a UE has a dual-connectivity configuration, a computing system could detect that the UE's reported CQI for one of its two connections is threshold low (and perhaps when CQI for the other of the UE's connections is not threshold low), and the computing system could responsively de-configure that one of the UE's connections, tearing down the UE's air-interface connection and the associated access bearer and stopping the associated NB from serving the UE, while allowing the other NB to continue serving the UE. The UE would then be served instead in a single-connectivity configuration over its other existing connection.

Implementing this in practice, however, raises some technological challenges that are further addressed by this disclosure.

One difficulty is that, if the NB whose connection with the UE has threshold poor quality is the slave-NB, then that NB could not autonomously release its access bearer for the UE. This is because the control-plane for the UE is not homed to that NB but is rather homed to the master-NB.

To help address this issue, the present disclosure provides that when a given NB's connection with the UE has threshold poor quality, another NB that is serving the UE could take action to trigger release the access bearer homed to the given NB. For instance, consider a scenario where the UE has dual-connectivity with NB1 and NB2 and where (i) NB1 is the master-NB at which the UE's control-plane is homed, (ii) NB2 is the slave-NB, and (iii) NB2's connection with the UE has threshold poor quality. In that scenario, NB2 could report to NB1 the UE's reported poor quality, and NB1 could responsively engage in signaling with a core-network control node over the control-plane, to trigger teardown of the UE's access bearer that is homed to NB2. Further, NB1 could responsively engage in signaling with NB2 to coordinate teardown of NB2's air-interface connection with the UE. NB1 could then continue to serve the UE over its existing air-interface connection with the UE, with its existing access bearer and control-plane for the UE.

Another technological difficulty is that, if the NB whose connection with the UE has threshold poor quality is the master-NB, then discontinuing that NB's service of the UE could result in a loss of the control-plane for the UE altogether, since the control-plane for the UE's dual-connectivity configuration is homed to that NB.

To help address this issue, the present disclosure further provides that when a given NB's connection with the UE has threshold poor quality, a control-plane homed to that NB will be transferred to another NB that is already serving the UE, and the access bearer homed to the given NB will be torn down. For instance, consider a scenario where the UE has dual-connectivity with NB1 and NB2 and where (i) NB1 is the master-NB at which the UE's control plane is homed, (ii) NB2 is the slave-NB, and (iii) NB1's connection with the UE has threshold poor quality. In that scenario, NB1 could respond to threshold poor quality on its connection with the UE by engaging in signaling with a core-network control node over the control-plane, to trigger transfer of the control-plane from being homed to NB1 to being homed to NB2 and to trigger teardown of the access bearer homed to NB1, and NB1 could tear down its air-interface connection with the UE. NB2 could then continue to serve the UE over its existing air-interface connection with the UE, with the transferred control-plane.

In addition, with this implementation, it may be the case that NB2 (the already-serving NB to which the control-plane will be transferred) has a default or preferred core network that is different than the core network that NB1 (as master-NB) had used and thus that NB2 (as slave-NB), was using— e.g., with different control nodes and gateways. In that case, the process could additionally involve transferring the UE's control-plane and user-plane from the existing, first core network to the different, second core network. In particular, the control-plane homed to NB1 in the first core network could be transferred to the second core network and to be homed to the already-serving NB2 instead of NB1, and the access bearer homed to NB2 in the first core network could also be transferred to the second core network as well (and still homed to NB2).

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a network that includes both 4G LTE and 5G-NR NBs that have communication paths with multiple DCNs, and where representative UEs are capable of engaging in EN-DC service (e.g., each having a 4G radio and a 5G radio and being capable of engaging in communication concurrently via those radios). It should be understood, however, that the principles disclosed herein could extend to apply with respect to other scenarios as well, such as with respect to other radio access technologies. Further, it should be understood that other variations from the specific arrangements and processes described are possible. For instance, various described entities, connections, functions, and other elements could be added, omitted, distributed, re-located, re-ordered, combined, or changed in other ways.

Figure 1:
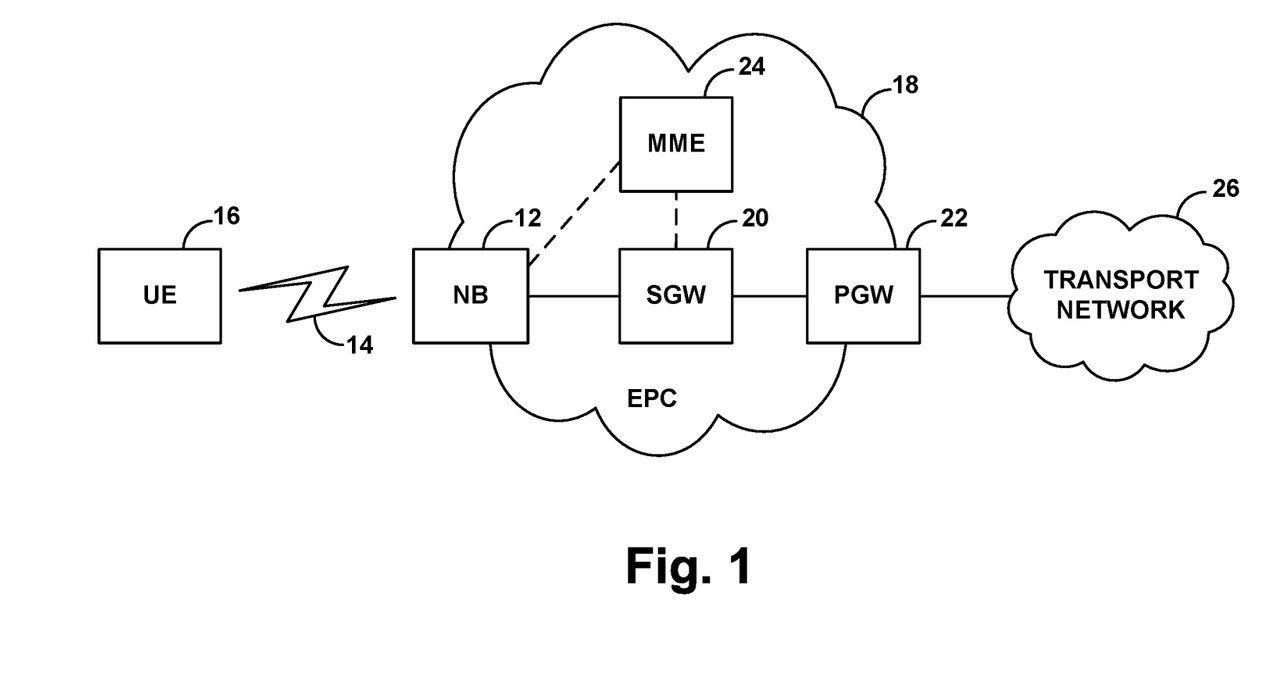
FIG. 1 is a simplified block diagram of an example 4G network arrangement.
Figure 2:
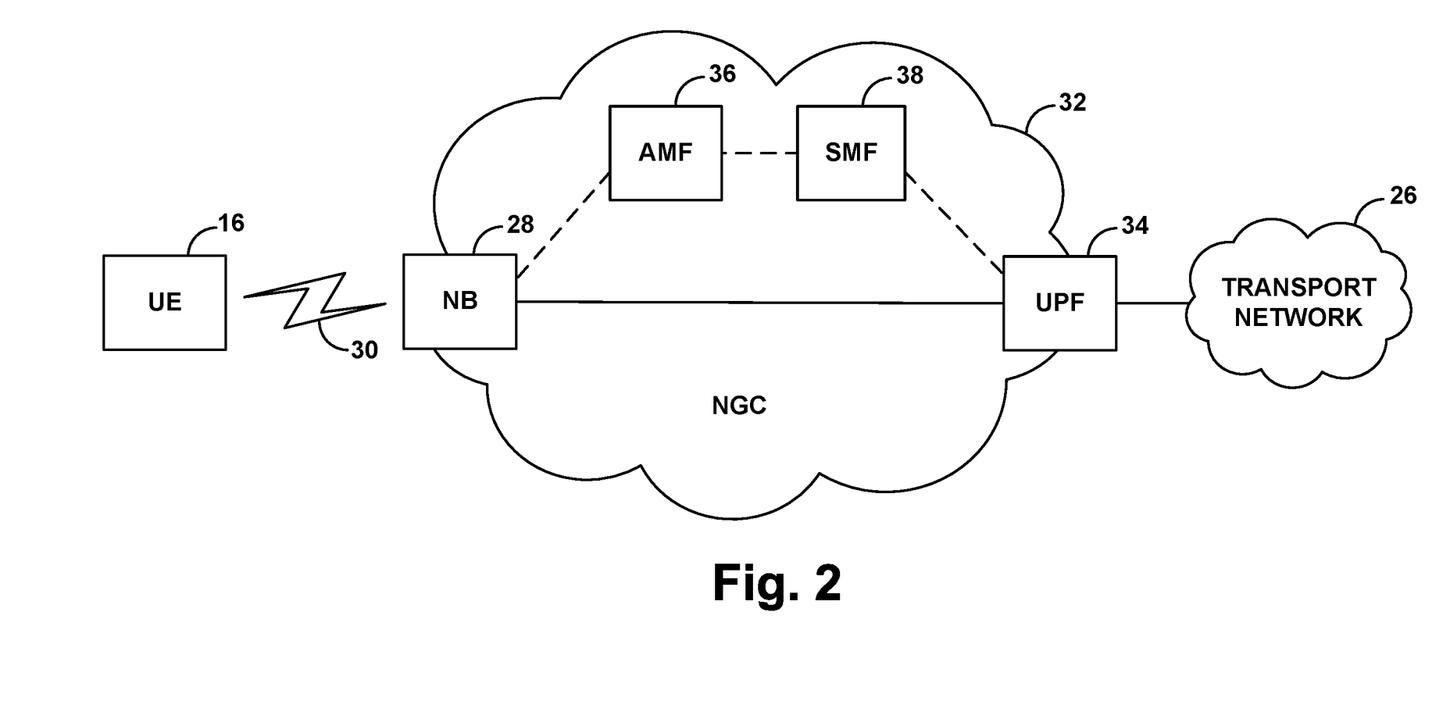
FIG. 2 is a simplified block diagram of an example 5G network arrangement.

FIGS. 1 and 2 depict example 4G and 5G networks, each including at least one NB, at least one control-plane node, and at least one user-plane node, and each providing connectivity with a representative transport network such as the Internet.

As shown in FIG. 1, an example 4G network includes a 4G NB (evolved NB (eNB)) 12, which provides a 4G coverage area 14 in which to serve UEs such as a representative UE 16. The 4G NB then sits as a node on an Enhanced Packet Core (EPC) access network 18 including an SGW 20, a PGW 22, and an MME 24. In particular, the 4G NB has an interface with the SGW, the SGW has an interface with the PGW, and the PGW connectivity with a transport network 26. Further, the 4G NB also has an interface with the MME, which also has an interface with the SGW.

In this 4G arrangement, the SGW and PGW operate as user-plane nodes through which user-plane communications (e.g., application-layer user communications) flow between the 4G NB and the transport network. And the MME operates as a control-plane node, responsible for coordinating setup of bearer connections and other control functions.

In line with the discussion above, when UE 16 enters into coverage of the 4G NB, the UE may discover coverage of the 4G NB (e.g., by detecting broadcast from the NB of a synchronization signal at a predefined center frequency of a carrier, and by detecting a threshold strong reference-signal broadcast from the 4G NB). The UE may then engage in access signaling and RRC signaling with the 4G NB to establish a 4G RRC connection defining a logical air interface connection through which the 4G NB will serve the UE. Further, the UE may transmit via its 4G RRC connection to the 4G NB an attach request to trigger registration of the UE for service.

Upon receipt of the UE's attach request, the 4G NB may forward the attach request to the MME, with this and/or other signaling and operations establishing for the UE a control-plane signaling path (e.g., S1-MME) between the 4G NB and the MME. The MME may then coordinate setup for the UE of a user-plane access bearer for carrying packet data between the 4G NB and the SGW. For instance, the MME could engage in bearer-setup signaling with the 4G NB and the SGW to establish for the UE an S1-U tunnel between the 4G NB and the SGW, discovering tunnel endpoint identifier (TEIDs) at the 4G NB and SGW and informing the 4G NB and SGW of each other's TEIDs as endpoints of the S1-U tunnel. Further, the SGW could responsively engage in signaling with the PGW to establish for the UE an S5 tunnel between the SGW and the PGW, the SGW could bridge the UE's S1-U and S5 tunnels together to effectively define for the UE a 4G access bearer extending between the 4G NB and the PGW, and the PGW could assign to the UE an IP address for communication on the transport network.

At this point, the 4G NB could then serve the UE in an RRC connected mode, scheduling downlink air interface communication to the UE of data that passes over the UE's 4G access bearer from the transport network, and scheduling uplink air interface communication of data from the UE, for forwarding over the UE's 4G access bearer to the transport network.

In FIG. 2, an example 5G network includes a 5G NB (gigabit NB (gNB)) 28, which provides a 5G coverage area 30 in which to serve UEs such as representative UE 16. The 5G NB then sits as a node on a Next Generation Core (NGC) access network 32 including an UPF 34, AMF 36, an SMF 38. In particular, the 5G NB has an interface with the UPF, and the UPF provides connectivity with transport network 26. Further, the 5G NB also has an interface with the AMF, the AMF has an interface with the SMF, and the SMF has an interface with the UPF.

In this 5G arrangement, the UPF operates as a user-plane node, through which user-plane communications flow between the 5G NB and the transport network. And the AMF and SMF cooperatively define a control-plane subsystem and operate as control-plane nodes, responsible for coordinating setup of bearer connections and other control functions.

With this arrangement, when UE 16 enters into coverage of the 5G NB, the UE may discover coverage of the 5G NB (in a manner similar to that described above). The UE may then engage in access signaling and RRC signaling with the 5G NB to establish a 5G RRC connection defining a logical air interface connection through which the 5G NB will serve the UE. Further, the UE may transmit via its 5G RRC connection to the 5G NB an attach request to trigger registration of the UE for service.

Upon receipt of the UE's attach request, the 5G NB may forward the attach request to the AMF, and the AMF may send a create-session request to the SMF, with this or other signaling establishing for the UE a control-plane signaling path extending effectively between the 5G NB and the SMF. Further, the SMF may responsively engage in bearer-setup signaling with the UPF and, via the AMF, with the 5G NB, to establish for the UE a tunnel defining a 5G access bearer that extends between the 5G NB and the UPF. For instance, the SMF could discover TEIDs at the 5G NB and UPF and inform the 5G NB and UPF of each other's TEIDs as endpoints of the access bearer. And the UPF may assign to the UE an IP address for communication on the transport network.

At this point, the 5G NB could then likewise serve the UE in an RRC connected mode, scheduling downlink air interface communication to the UE of data that passes over the UE's 5G access bearer from the transport network, and scheduling uplink air interface communication of data from the UE, for forwarding over the UE's 5G access bearer to the transport network.

Figure 3:
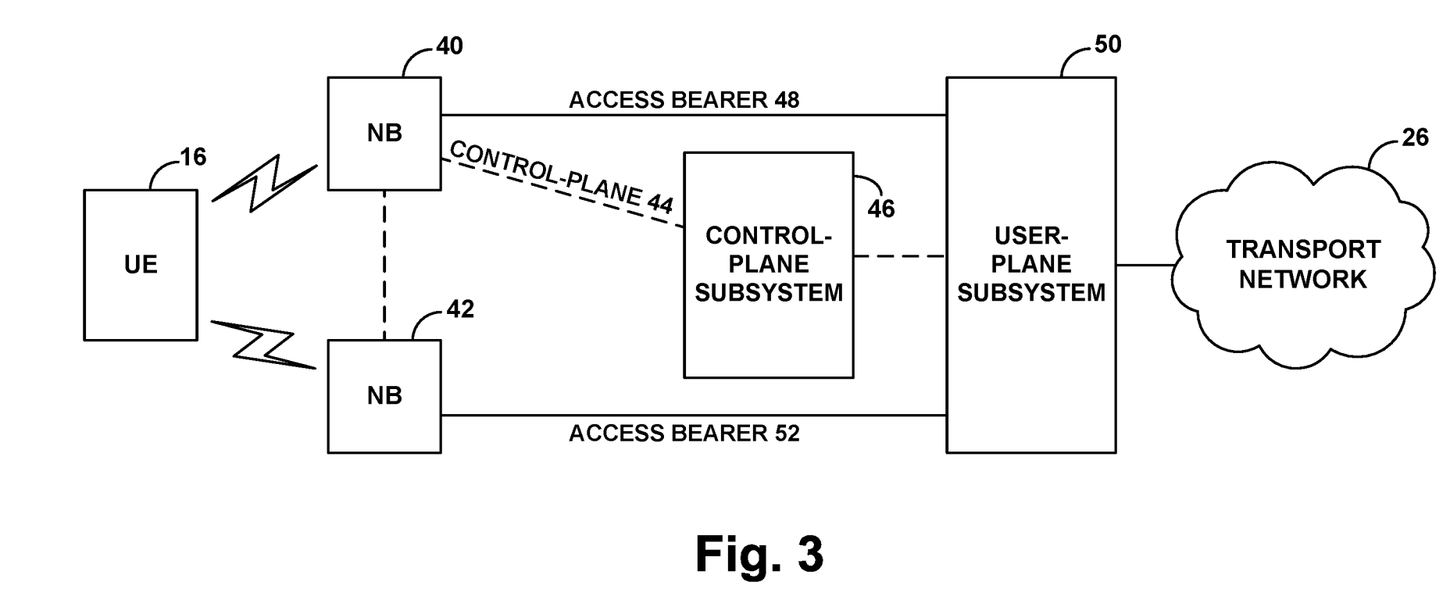
FIG. 3 is a simplified block diagram of an example dual-connectivity service configuration.

FIG. 3 next depicts an example dual-connectivity network arrangement. In particular, the arrangement of FIG. 3 includes two representative NBs 40, 42 such as a 4G NB and a 5G NB which could be co-located (e.g., positioned at a common cell site, sharing a common antenna tower and/or other NB equipment). Each of these NBs provides coverage according to a respective radio access technology. In the example arrangement, though, both NBs may sit as nodes on a common core network, such as an EPC or an NGC. Further, both NBs may sit as nodes on multiple core networks, including an EPC and an NGC for instance.

In a representative dual-connectivity implementation, as noted above, one of the NBs operates as a master-NB, and the other NB operates as a slave-NB. The master-NB could be the NB with which the UE initially connects and could coordinate or trigger addition of a slave-NB connection for the UE. A single core network, such as an EPC or NGC, could be used for both of the NBs in this situation, with a separate access bearer for the UE being homed respectively to each NB, and with a control-plane signaling path for both of the UE's connections being homed to the master-NB.

In line with the discussion above, for instance, the UE could first discover coverage of and connect with NB 40 and the UE could engage in attachment via NB 40, so that a control-plane signaling path 44 for the UE would be established between NB 40 and control-plane subsystem (e.g., an MME, or an AMF and SMF) 46, and an access bearer 48 for the UE would be established between NB 40 and a user-plane subsystem 50 (e.g., an SGW and PGW, or a UPF). As such, the control-plane signaling path 44 and access bearer 48 would each be anchored or homed to NB 40.

Operating as a master-NB, NB 40 could then direct the UE to scan for secondary coverage and could receive from the UE a report that the UE has detected sufficient coverage from NB 42. And in response, NB 40 could direct the UE to connect with NB 42, which the UE could do as discussed above. Further, NB 40 could engage in signaling with NB 42 to inform NB 42 that this is a dual-connectivity scenario with NB 40 as master-NB, so that NB 42 will operate as a slave-NB in signaling communication with master-NB 40.

And NB 40 could engage in signaling over its existing control-plane signaling path 44 with control-plane subsystem 46 to trigger setup for the UE of an access bearer 52 between NB 42 and user-plane subsystem 50, i.e., an access bearer homed to NB 42. Here, control-plane subsystem 46 could engage in signaling with NB 42 via the control-plane signaling path homed to NB 40 and through inter-NB signaling between NB 40 and NB 42 and could further engage in signaling with user-plane subsystem 50. NB 42 could thus inform control-plane subsystem 46 of a TEID at NB 42, which control-plane subsystem 46 could share with user-plane subsystem 50, and user-plane subsystem 50 could inform control-plane subsystem 46 of a TEID at user-plane subsystem 50, which control-plane subsystem 46 could share with NB 42. And NB 42 and user-plane subsystem 50 could use these TEIDs as endpoints of the access bearer 52.

As noted above, access bearers 48, 52 could define a split-bearer arrangement, with splitting at user-plane node such as an SGW or UPF. For instance, if the core network is an EPC as discussed above, the UE may have an established S5 tunnel between a PGW and an SGW, and the UE may have two separate S1-U tunnels, one from the SGW to NB 40, and another from the SGW to NB 42, thus defining a split at the SGW. And if the core network is an NGC as discussed above, the UE may have an established access bearer tunnel from the UPF to NB 40 and a separate established access bearer tunnel from the UPF to NB 42.

In either case, when the user-plane subsystem 50 receives downlink data for transmission to the UE, the user-plane subsystem 50 could send some of the downlink data via access bearer 48 for transmission by NB 40 over the air to the UE and could send other of the downlink data via access bearer 52 for transmission by NB 42 over the air to the UE.

As further noted above, in this dual-connectivity arrangement, each NB could regularly receive CQI reports from the UE, with each report indicating quality of the air interface communication channel between the NB and the UE. In a representative system, the CQI reported by the UE could be a CQI index value from 1 to 15, with lower CQI corresponding with poorer channel quality and higher CQI corresponding with higher channel quality. And as noted above, each NB could use these received CQI reports as a basis to determine an MCS to direct for air interface communication between the NB and the UE.

Per the present disclosure, a first one of the UE's serving NBs could detect based on the UE's CQI reports and/or one or more other factors (possibly uplink signal analysis) when channel quality between the first NB and the UE is threshold poor. For instance, the first NB could detect when the UE's reported CQI is lower than a predefined threshold, such as CQI 6 or another CQI value, perhaps when the CQI remains at or below the threshold for at least a predefined threshold period of time. Further, the detecting could be based on one or more current CQI reports from the UE and/or one or more past CQI reports from the UE at a similar time of day and/or at a similar location (which could indicate that the UE's channel quality is about to become threshold poor).

In addition, the second one of the UE's serving NBs could detect based on similar reports and/or other factors that channel quality of its air-interface connection with the UE is not threshold poor (e.g., is threshold high). For instance, the second NB could detect that that QCI for the connection between it and the UE is at least as high as a predefined threshold value, such as QCI 12 or another QCI value, perhaps for at least a predefined threshold period of time, and also possibly based on current and/or historical data. And the second NB could report this to the first NB, via an inter-NB interface.

As noted above, when the first NB detects threshold poor channel quality between the first NB and the UE, perhaps specifically when the second NB detects that channel quality between the second NB and the UE is not threshold poor, the UE could be transitioned from dual-connectivity served by both NBs to single-connectivity served by just the second NB.

To help address the technological challenges as noted above, however, the present disclosure provides additional advances.

Figure 4:
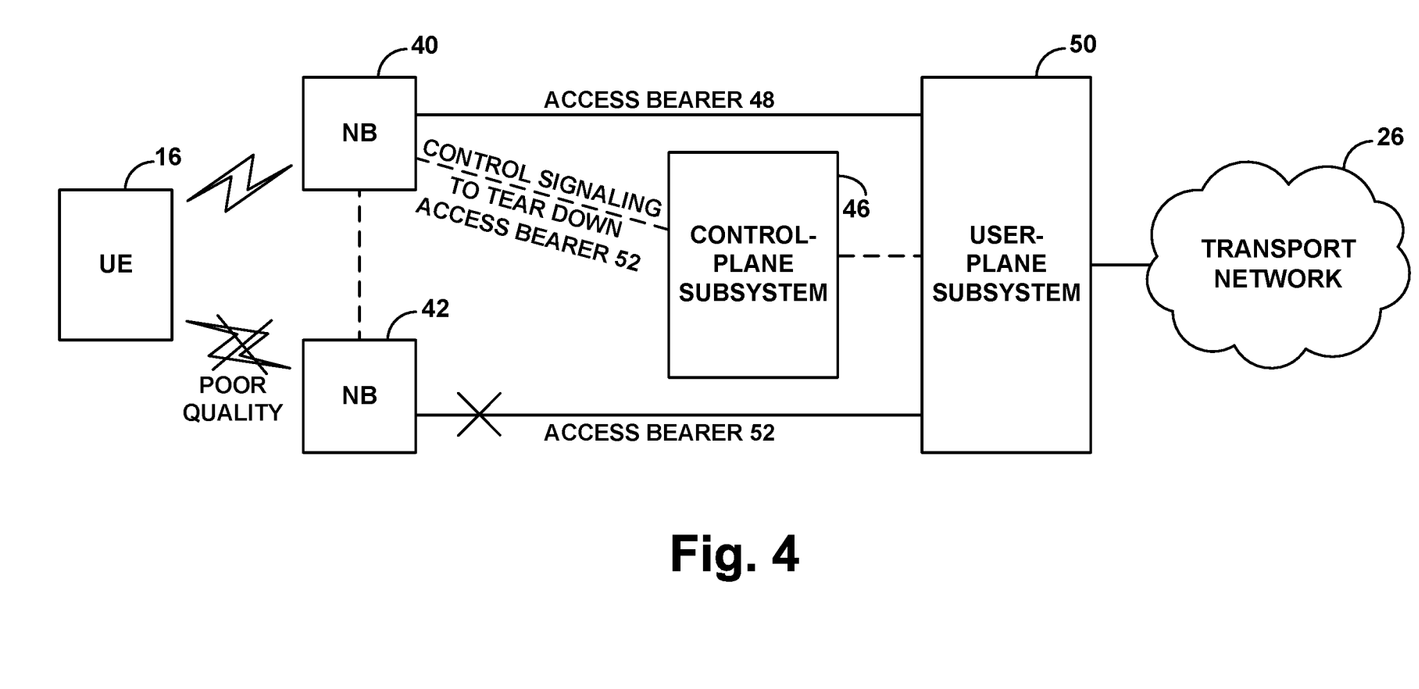
FIG. 4 is a simplified block diagram depicting example reconfiguration for transitioning a served UE from dual-connectivity service to single-connectivity service.

First, when the UE has threshold poor connection with a first one of its serving NBs, the present disclosure provides that another, second one of the UE's serving NBs will take action to trigger teardown of the UE's access bearer homed to the first NB. FIG. 4 illustrates this scenario, based on the arrangement shown in FIG. 3, with the first NB being slave-NB 42.

As shown in FIG. 4, slave-NB 42 could detect that the quality of the communication channel between it and the UE is threshold poor. As the control-plane signaling path 44 is not homed to NB 42, NB 42 would not itself engage in control-plane signaling with control-plane subsystem 46 to tear down access bearer 52. Instead, in this scenario, NB 42 will responsively inform the UE's other serving NB, NB 40, of the threshold-poor channel quality situation, and NB 40 will engage in control-plane signaling over the control-plane signaling path homed to NB 40, to trigger teardown of access bearer 52 homed to NB 40.

In particular, NB 42 could report over an inter-NB interface to NB 40 that the quality of the communication channel between NB 42 and the UE is threshold poor. In response to this, possibly conditioned on NB 40 determining that the quality of the communication channel between NB 40 and the UE is threshold high, NB 42 could then engage in signaling with control-plane subsystem 46 to trigger teardown of access bearer 52, as shown by an X in the figure. Further, NB 40 could also responsively engage in further signaling with NB 42 to direct NB 42 to tear down the RRC connection between NB 42 and the UE, as similarly shown by an X in the figure. NB 40 could then continue to serve the UE over its existing RRC connection with the UE, using the UE's existing access bearer 48 and control-plane signaling path 44.

In an EN-DC scenario, this process could play out differently depending on the structure of the core network, and depending on which NB is the 4G NB and which NB is the 5G NB, and the process could apply with any combination of these factors.

By way of example and without limitation, consider a scenario where NB 40 is the 4G NB, NB 42 is the 5G NB, and the core network is an EPC network. In that scenario, when the 5G NB receives a report of threshold low CQI from the UE, the 5G NB could report this poor-CQI situation to the 4G NB. And the 4G NB could then responsively engage in signaling with an MIME to trigger teardown of UE's 5G access bearer 52. To tear down the UE's 5G access bearer 52, the MME could engage in signaling with the SGW and, via the 4G NB, with the 5G NB to release the UE's S1-U tunnel between the SGW and the 5G NB and to clear associated context records. What remains will then be the UE's existing S5 tunnel between the PGW and the SGW and the UE's existing S1-UE tunnel between the SGW and the 4G NB. Further, the 4G NB could engage in signaling with the 5G NB to cause the 5G NB to release the UE's 5G RRC connection and clear its associated context record. The UE could then be served in a single-connectivity mode by the 4G NB, with the UE's existing access bearer 48 homed to the 4G NB and the UE's existing control-plane signaling path 44 also homed to the 4G NB.

Figure 5:
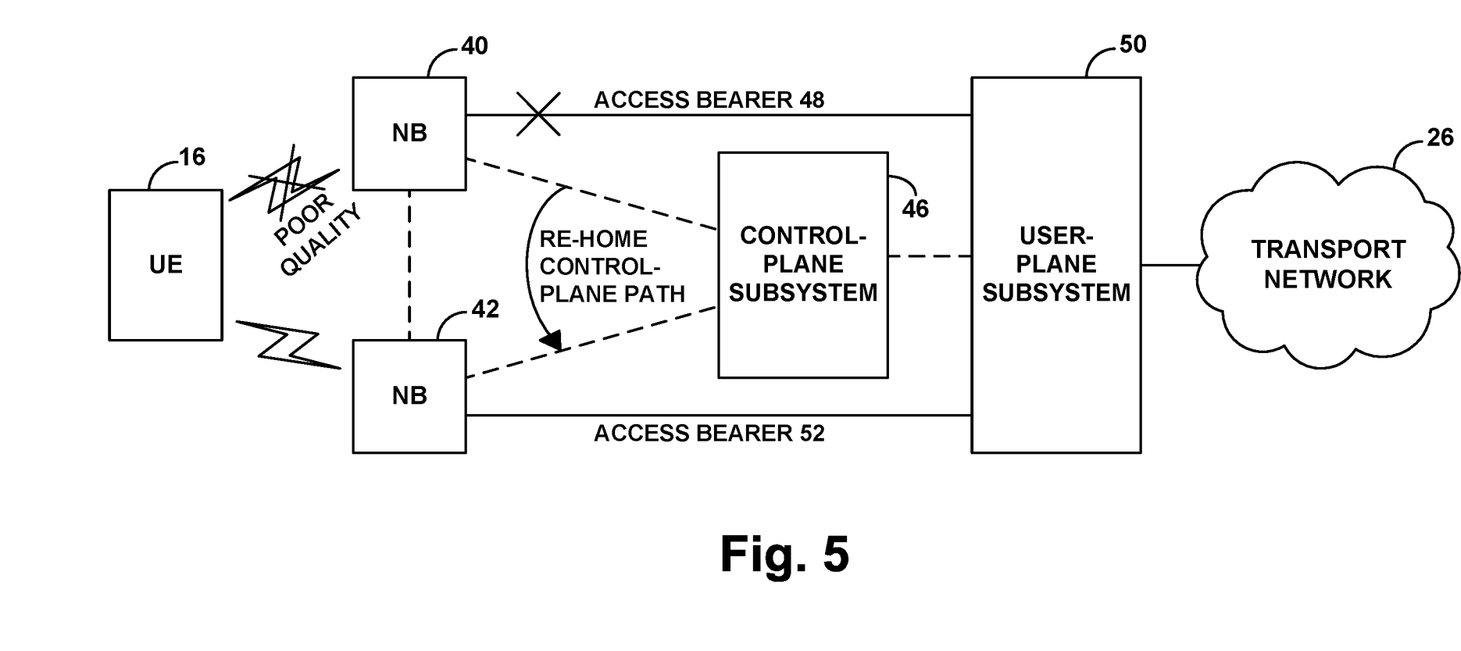
FIG. 5 is a simplified block diagram depicting another example reconfiguration for transitioning a served UE from dual-connectivity service to single-connectivity service.

Second, in a scenario where a first NB with which the UE has a threshold poor connection is the master-NB, the present disclosure provides for transfer of the UE's control-plane signaling path from being homed to that first NB to being homed to another, second NB that is already serving the UE. FIG. 5 illustrates this scenario, also based on the arrangement shown in FIG. 3.

As shown in FIG. 5, master-NB 40 could detect that the quality of the communication channel between it and the UE is threshold poor. Because having the UE's control-plane signaling path 44 for both of the UE's connections is homed to NB 40, having NB 40 discontinue service of the UE would disrupt the UE's service by the NB 42 as well. To help avoid this issue, in this scenario, the UE's control-plane signaling path homed to NB 40 will be transferred to be homed instead to the other NB 42 that is already serving the UE, and service of the UE by NB 40 could then be discontinued.

In particular, in response to detecting that the quality of the communication channel between NB 40 and the UE is threshold poor, NB 40 could engage in signaling with the control-plane subsystem over the UE's control-plane signaling path 44 (i) to trigger transfer of the control-plane signaling path from being homed to NB 40 to instead being homed to NB 42 and (ii) to trigger teardown of the access bearer homed to NB 40. For instance, NB 40 could send to the control-plane subsystem, via the control-plane signaling path, a message that the control-plane subsystem is configured to interpret as a request/directive to carry out these operations.

The control-plane subsystem and NB 40 could thus responsively engage signaling with the NB 40, NB 42, and user-plane subsystem 50, to transfer the control-plane signaling path 44 from being homed to NB 40 to being homed instead to NB 42 as shown by an arrow in the figure, and to tear down access bearer 48, as shown by an X in the figure. In addition, NB 40 could responsively tear down its RRC connection with the UE, as similarly shown by an X in the figure. NB 42 could then continue to serve the UE over its existing RRC connection with the UE, using existing access bearer 52 and newly transferred control-plane signaling path 44.

Here too, in an EN-DC scenario, this process could play out differently depending on the structure of the core network, and depending on which NB is the 4G NB and which NB is the 5G NB, and the process could likewise apply with any combination of these factors.

As another non-limiting example, consider a scenario where NB 40 is the 5G NB, NB 42 is the 4G NB, and the core network is an NGC network. In that scenario, when the 5G NB receives a report of threshold low CQI from the UE, the 5G NB could transmit a predefined signal to the AMF to trigger teardown of the UE's 5G access bearer and to trigger transfer of the UE's control-plane signaling path from being homed to the 5G NB to being homed instead to the 4G NB.

In response to this signal, the AMF could engage in signaling with the 4G NB to inform the 4G NB that the UE's control-plane signaling path will be transferred to the 4G NB and to verify that that transfer will be acceptable (e.g., that the 4G NB has resources to support it). And the AMF could signal to the SMF to notify the SMF that control-plane signaling will now be with the 4G NB, and the SMF could update its context record for the UE accordingly. Further, the SMF could send a delete-session request to the UPF to direct teardown of the UE's 5G access bearer. And the SMF could respond to the AMF, which could then notify the 4G NB and could direct the 5G NB to release its context record for the UE, which the 4G NB could do, thus completing teardown of the UE's 5G access bearer. The UE could then be served in a single-connectivity mode by the 4G NB, with the UE's existing access bearer 52 homed to the 4G NB and the UE's control-plane signaling path 44 transferred to be homed to the 4G NB.

As further noted above, it may also be the case that the already-serving NB to which the control-plane signaling path will be transferred has a default or preferred core network that is different than the core network that was being used for service of the UE. In that case as noted, the process could additionally involve transferring the UE's service from one core network to another.

For instance, in the EN-DC example discussed above, when the 5G NB signals to the AMF of the NGC to trigger transfer of the UE's control-plane signaling path, the AMF could determine (e.g., based on profile data for the 4G NB, or in another manner) that the 4G NB's preferred core network is an EPC network rather than the NGC network.

In response, the AMF could then signal to an MME of the EPC network to trigger MME-orchestrated setup for the UE of a 4G access bearer in the EPC network (e.g., between the 4G NB and an PGW, via an SGW), to replace the 4G access bearer established for the UE in the NGC network (between the 5G NB and the UPF). The MME could thus responsively engage in signaling with the 4G NB, establishing a control-plane signaling path between the MME and the 4G NB, and could engage in signaling with the 4G NB and an SGW to establish for the UE an S1-U tunnel, and the SGW could engage in corresponding signaling with a PGW to establish for the UE and bridge with the S1-U tunnel an S5 tunnel.

Further, the MME could respond to the AMF, and the AMF could respond to the 5G NB to indicate that the transition from NGC to EPC is complete. The 5G NB could then send to the UE an RRC connection-reconfiguration message to inform the UE of the core-network change and could release its RRC connection with the UE. The 4G NB could thus continue to serve the UE using its existing RRC connection with the UE, but with control-plane signaling path and 4G access bearer newly established in the EPC network.

Figure 6:
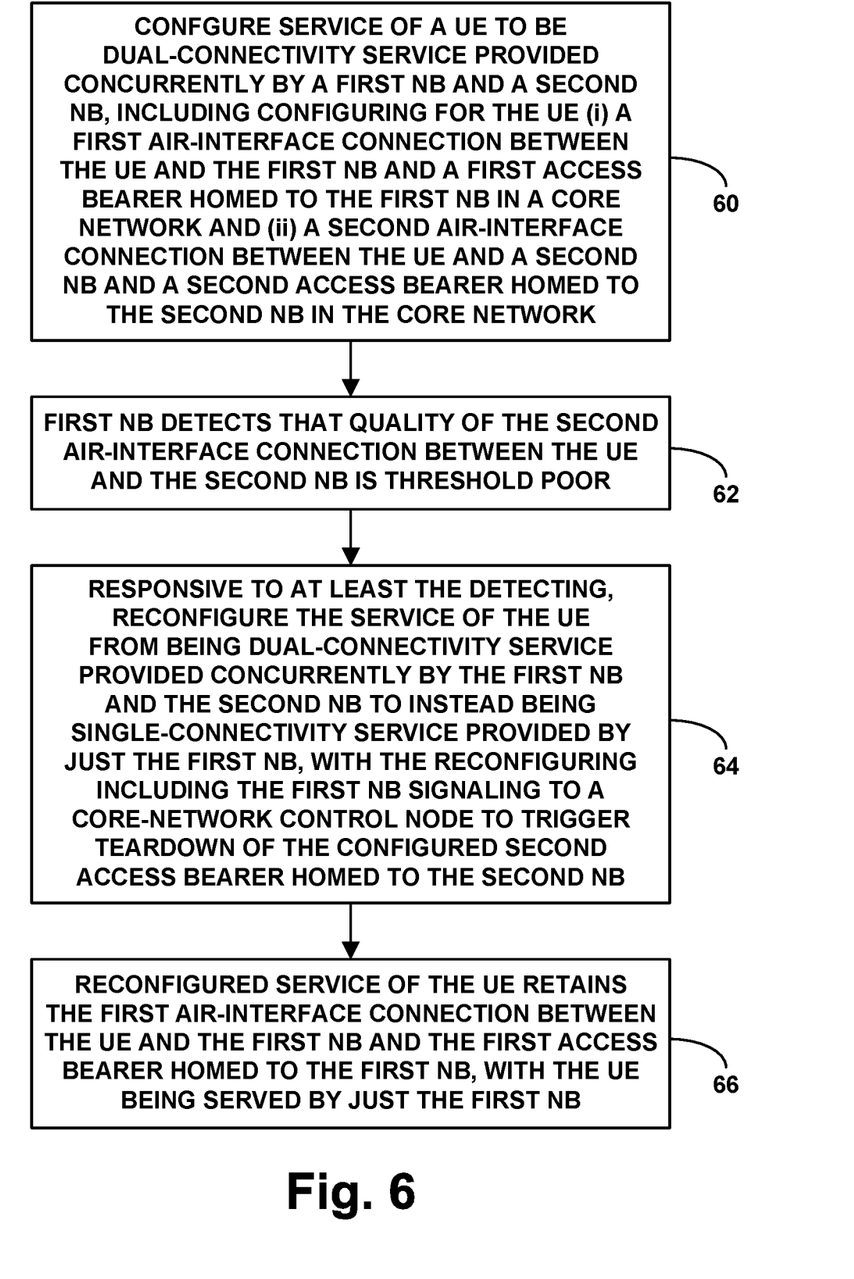
FIG. 6 is a flow chart depicting an example method in accordance with the present disclosure.

FIG. 6 is a flow chart depicting a method that can be carried out in accordance with the present disclosure to configure service of a UE. This method could be carried out by a wireless service provider that makes use of multiple NBs and a core network as described above for instance, or the method could be carried out specifically by one or more entities of such a network arrangement, or by one or more other entities.

As shown in FIG. 6, at block 60, the method includes configuring service of the UE to be dual-connectivity service provided concurrently by a first NB and a second NB, including configuring for the UE (i) a first air-interface connection between the UE and the first NB and a first access bearer homed to the first NB in a core network and (ii) a second air-interface connection between the UE and a second NB and a second access bearer homed to the second NB in the core network.

Further, at block 62, the method includes the first NB detecting that quality of the second air-interface connection between the UE and the second NB is threshold poor. And at block 64, the method includes, responsive to at least the first NB detecting that quality of the second air-interface connection between the UE and the second NB is threshold poor, reconfiguring the service of the UE from being dual-connectivity service provided concurrently by the first NB and the second NB to instead being single-connectivity service provided by just the first NB, with the reconfiguring including the first NB signaling to a core-network control node to trigger teardown of the configured second access bearer homed to the second NB.

At block 66, having applied these operations, the reconfigured service of the UE could thus retain the first air-interface connection between the UE and the first NB and the first access bearer homed to the first NB, with the UE being served by just the first NB.

In line with the discussion above, the act of reconfiguring the service of the UE could further include tearing down the second air-interface connection between the UE and the second NB.

In addition, the act of the first NB detecting that quality of the second air-interface connection between the UE and the second NB is threshold poor could involve first NB receiving from the second NB, over an inter-NB interface, an indication of the threshold poor quality of the second air-interface connection. For instance, the indication could be based on the UE having reported to the second NB a CQI index value that is at least as low as a predefined threshold CQI index value.

Further, as discussed above, a control-plane signaling path for the configured dual-connectivity of the UE could be homed to the first NB, and the act of the first NB signaling to the core-network control node to trigger teardown of the configured second access bearer homed to the second NB could involve the first NB signaling to the core-network control node over that control-plane signaling path.

Still further, as discussed above, the reconfiguring of service of the UE could be conditioned on, and thus further responsive to, the first NB also detecting that quality of the first air-interface connection between the UE and the first NB is threshold high (e.g., at least as high as a predefined high threshold and/or not lower than a predefined low threshold). For instance, the first NB could detect this by receiving from the UE, over the first air-interface connection, an indication of the threshold high quality of the first air-interface connection, such as a threshold high CQI report or the like.

Moreover, as discussed above, in the configured dual-connectivity service of the UE, the first NB could serve the UE in accordance with a first radio access technology (e.g., 4G or 5G), and the second NB serves the UE in accordance with a second radio access technology (e.g., 5G or 4G) different than the first radio access technology. Further, the first and second NBs could be collocated.

Figure 7:
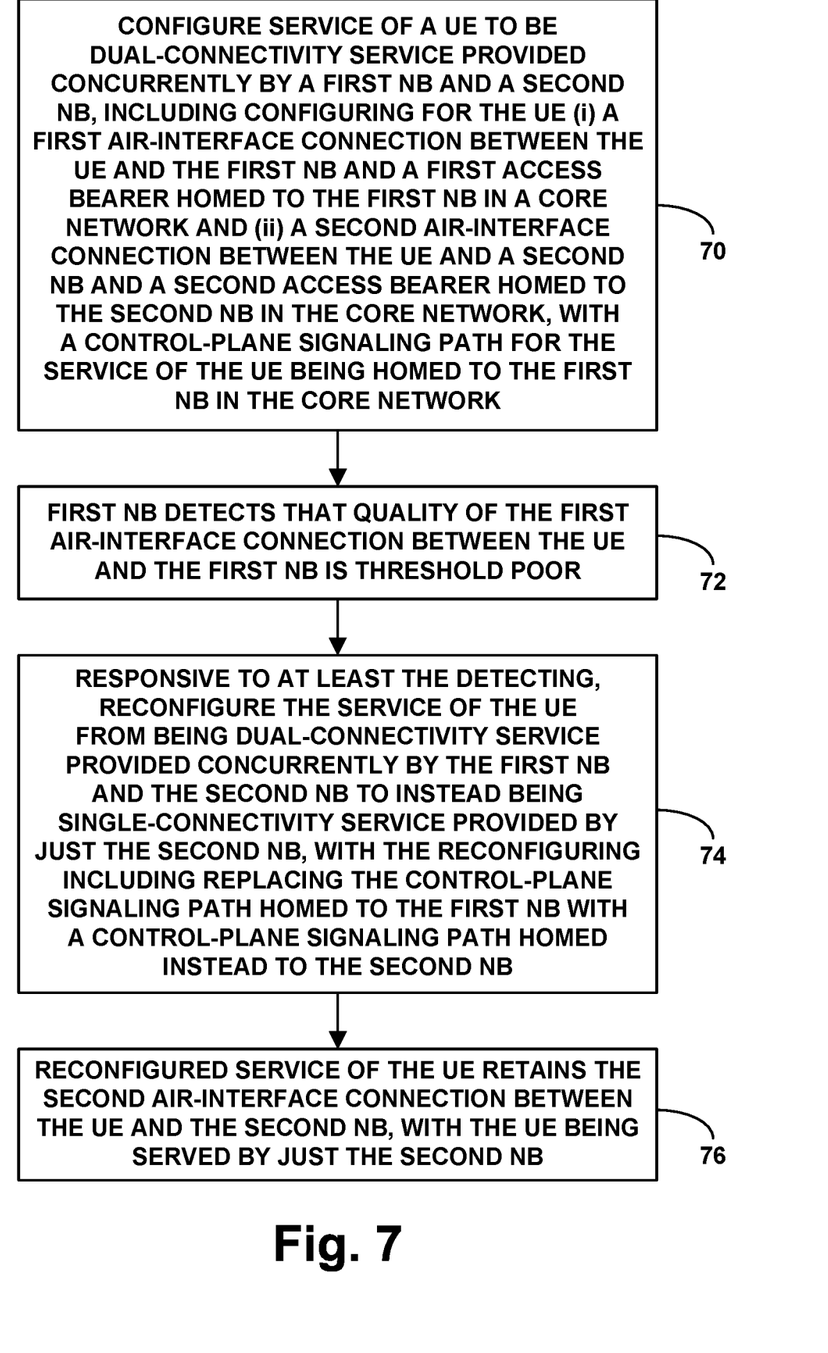
FIG. 7 is another flow chart depicting an example method in accordance with the present disclosure.

FIG. 7 is next another flow chart depicting a method that can be carried out in accordance with the present disclosure to configure service of a UE. This method could likewise be carried out by a wireless service provider that makes use of multiple NBs and a core network as described above for instance, or the method could be carried out specifically by one or more entities of such a network arrangement, or by one or more other entities.

As shown in FIG. 7, at block 70, the method includes configuring service of the UE to be dual-connectivity service provided concurrently by a first NB and a second NB, including configuring for the UE (i) a first air-interface connection between the UE and the first NB and a first access bearer homed to the first NB in a core network and (ii) a second air-interface connection between the UE and a second NB and a second access bearer homed to the second NB in the core network, with a control-plane signaling path for the service of the UE being homed to the first NB in the core network.

Further, at block 72, the method includes the first NB detecting that quality of the first air-interface connection between the UE and the first NB is threshold poor. And at block 74, the method includes, responsive to at least the first NB detecting that quality of the first air-interface connection between the UE and the first NB is threshold poor, reconfiguring the service of the UE from being dual-connectivity service provided concurrently by the first NB and the second NB to instead being single-connectivity service provided by just the second NB, with the reconfiguring including replacing the control-plane signaling path homed to the first NB with a control-plane signaling path homed instead to the second NB.

At block 76, having applied these operations, the reconfigured service of the UE could thus retain the second air-interface connection between the UE and the second NB, with the UE being served by just the second NB. Further, the reconfigured service could also retain the configured second access bearer homed to the second NB.

In line with the discussion above, the act of reconfiguring could further include tearing down the first air-interface connection between the UE and the first NB and tearing down the first access bearer homed to the first NB. Further, the reconfiguring could include the first NB signaling to a core-network control node to trigger the replacing of the control-plane signaling path homed to the first NB with the control-plane signaling path homed instead to the second NB. Thus, for instance, the first NB could signal to a core-network control node, over the control-plane signaling path homed to the first NB, to trigger at least (i) the replacing of the control-plane signaling path homed to the first NB with the control-plane signaling path homed instead to the second NB and (ii) the tearing down of the first access bearer homed to the first NB.

As further discussed above, an example implementation could also involve switching core networks. Thus, the core network of the method could be considered a first core network (e.g., an EPC or NGC), and the method could additionally involve transitioning the UE's service to a different core network (e.g., NGC or EPC), which could be considered a second core network. In that case, the act of replacing the control-plane signaling path homed to the first NB with the control-plane signaling path homed instead to the second NB could involve replacing the control-plane signaling path homed to the first NB in the first core network with a control-plane signaling path homed instead to the second NB in the second core network. And the act of reconfiguring the service of the UE could additionally involve replacing the second access bearer homed to the second NB in the first core network with a second access bearer homed to the second NB instead in the second core network.

As additionally discussed above, the act of reconfiguring of service of the UE could be conditioned on, and thus further responsive to, the first NB also detecting that quality of the second air-interface connection between the UE and the second NB is threshold high (e.g., at least as high as a predefined high threshold and/or not lower than a predefined low threshold). For instance, the first NB could detect this by receiving from the second NB, over an inter-NB interface, an indication of the threshold high quality of the second air-interface connection.

And still further, as discussed above, in the configured dual-connectivity service of the UE, the first NB could serve the UE in accordance with a first radio access technology (e.g., 4G or 5G), and the second NB serves the UE in accordance with a second radio access technology (e.g., 5G or 4G) different than the first radio access technology, and the first and second NBs could be collocated.

Figure 8:
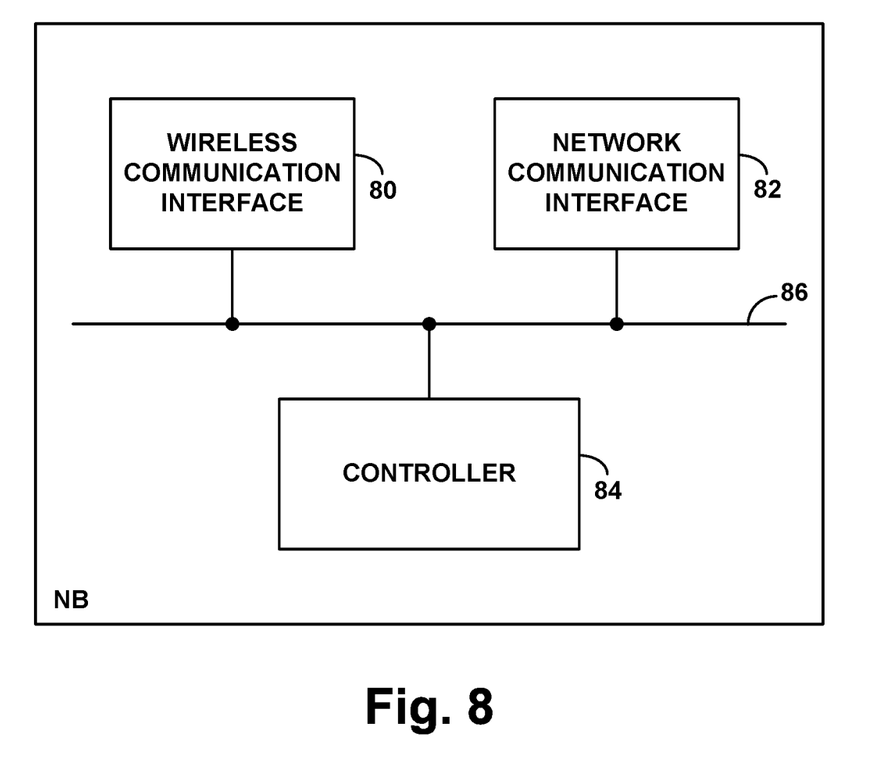
FIG. 8 is a simplified block diagram of a NB operable in accordance with the present disclosure.

Finally, FIG. 8 is a simplified block diagram depicting an example NB that could be operable in accordance with the present disclosure. As shown, the example NB includes a wireless communication interface 80, a network communication interface 82, and a controller 84, all of which may be communicatively linked together by a system bus, network, or other connection mechanism 86.

In this arrangement, the wireless communication interface 80 could be configured to provide cellular coverage and to provide air-interface service, engaging in air interface communication with served UEs. As such, wireless communication interface 80 could comprise an antenna structure, which may be tower mounted or may take other forms, and associated components such as a power amplifier and a wireless transceiver, so as to facilitate providing a coverage area defining an air interface having a downlink and an uplink, and engaging in transmission and reception of bearer and control data over the air interface in accordance with an air interface protocol such as any of those noted above. Further, network communication interface 82 could comprise a wired or wireless interface, such as an Ethernet network communication interface, configured to support communication with other entities, such as entities on an EPC and/or entities on an NGC for instance.

Controller 84 could then comprise control logic to cause the NB to carry out particular operations including those discussed above. As such, the controller 84 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding, storing, encoded with, or otherwise embodying or having program instructions executable by the processing unit to cause the NB to carry out various operations described herein. It should also be understood that the present disclosure contemplates a non-transitory computer readable medium having encoded thereon program instructions executable to carry out such operations as well.

In an example implementation, this NB could be a first NB, and the controller could cause the first NB to carry out operations for controlling service of a UE. For instance, the operations could include detecting that, when (i) the first NB is providing service to the UE over a first air-interface connection concurrently with a second NB providing service to the UE over a second air-interface connection and (ii) a control-plane signaling path cooperatively for the first NB's service of the UE and the second NB's service of the UE is homed to the first NB in the core network, quality of the first air-interface connection over which the first NB provides service to the UE is threshold poor. And the operations could include, responsive to at least the detecting, signaling over the control-plane signaling path to a core-network control node to trigger replacement of the control-plane signaling path homed to the first NB with a control-plane signaling path instead homed to the second NB.

Further, when the first NB is providing service to the UE over a first air-interface connection concurrently with a second NB providing service to the UE over a second air-interface connection, a first access bearer for the UE could be homed to the first NB in the core network and a second access bearer for the UE could be homed to the second NB in the core network. And in that case, the signaling over the control-plane signaling path to the core-network control node could also trigger teardown of the first access bearer homed to the first NB in the core network.

Further, as discussed above, the operation of signaling over the control-plane signaling path could be conditioned on, and thus additionally responsive to, the first NB detecting that, when the quality of the first air-interface connection over which the first NB provides service to the UE is threshold poor, quality of the second air-interface connection over which the second NB provides service to the UE is threshold high.

Exemplary embodiments have been described above. Those skilled in the art will understand, however, that changes and modifications may be made to these embodiments without departing from the true scope and spirit of the invention.

We claim:

1. A method for configuring service of a user equipment device (UE), the method comprising:
configuring service of the UE to be dual-connectivity service provided concurrently by a first Node-B (NB) and a second NB, including configuring for the UE (i) a first air-interface connection between the UE and the first NB and a first access bearer homed to the first NB in a core network and (ii) a second air-interface connection between the UE and a second NB and a second access bearer homed to the second NB in the core network;
detecting by the first NB that quality of the second air-interface connection between the UE and the second NB is threshold poor; and
responsive to at least the first NB detecting that quality of the second air-interface connection between the UE and the second NB is threshold poor, reconfiguring the service of the UE from being dual-connectivity service provided concurrently by the first NB and the second NB to instead being single-connectivity service provided by just the first NB, wherein the reconfiguring comprises the first NB signaling to a core-network control node to trigger teardown of the configured second access bearer homed to the second NB,
wherein the reconfigured service of the UE retains the first air-interface connection between the UE and the first NB and the first access bearer homed to the first NB.

2. The method of claim 1, wherein the reconfiguring further comprises tearing down the second air-interface connection between the UE and the second NB.

3. The method of claim 1, wherein detecting by the first NB that quality of the second air-interface connection between the UE and the second NB is threshold poor comprises receiving by the first NB from the second NB, over an inter-NB interface, an indication of the threshold poor quality of the second air-interface connection.

4. The method of claim 3, wherein the indication of the threshold poor quality of the second air-interface connection is based on the UE having reported to the second NB a channel quality indicator (CQI) index value that is at least as low as a predefined threshold CQI index value.

5. The method of claim 1, wherein for the configured dual-connectivity service of the UE, a control-plane signaling path is homed to the first NB, and wherein the first NB signaling to the core-network control node to trigger teardown of the configured second access bearer homed to the second NB comprises the first NB signaling to the core-network control node over the control-plane signaling path.

6. The method of claim 1, wherein the reconfiguring service of the UE from being dual-connectivity service provided concurrently by the first NB and the second NB to instead being single-connectivity service provided by the first NB is additionally responsive to detecting by the first NB that quality of the first air-interface connection between the UE and the first NB is threshold high.

7. The method of claim 6, wherein detecting by the first NB that quality of the first air-interface connection between the UE and the first NB is threshold high comprises receiving by the first NB from the UE, over the first air-interface connection, an indication of the threshold high quality of the first air-interface connection.

8. The method of claim 1, wherein in the configured dual-connectivity service of the UE, the first NB serves the UE in accordance with a first radio access technology, and the second NB serves the UE in accordance with a second radio access technology different than the first radio access technology.

9. A method for configuring service of a user equipment device (UE), the method comprising:
    configuring service of the UE to be dual-connectivity service provided concurrently by a first Node-B (NB) and a second NB, including configuring for the UE (i) a first air-interface connection between the UE and the first NB and a first access bearer homed to the first NB in a core network and (ii) a second air-interface connection between the UE and a second NB and a second access bearer homed to the second NB in the core network, wherein a control-plane signaling path for the service of the UE is homed to the first NB in the core network;
    detecting by the first NB that quality of the first air-interface connection between the UE and the first NB is threshold poor; and
    responsive to at least the first NB detecting that quality of the first air-interface connection between the UE and the first NB is threshold poor, reconfiguring the service of the UE from being dual-connectivity service provided concurrently by the first NB and the second NB to instead being single-connectivity service provided by just the second NB, wherein the reconfiguring comprises replacing the control-plane signaling path homed to the first NB with a control-plane signaling path homed instead to the second NB,
    wherein the reconfigured service of the UE retains the second air-interface connection between the UE and the second NB.

10. The method of claim 9, wherein the reconfiguring further comprises tearing down the first air-interface connection between the UE and the first NB and tearing down the first access bearer homed to the first NB.

11. The method of claim 10, wherein the reconfiguring further comprises the first NB signaling to a core-network control node, over the control-plane signaling path homed to the first NB, to trigger at least (i) the replacing of the control-plane signaling path homed to the first NB with the control-plane signaling path homed instead to the second NB and (ii) the tearing down of the first access bearer homed to the first NB.

12. The method of claim 9, wherein the reconfiguring comprises the first NB signaling to a core-network control node to trigger the replacing of the control-plane signaling path homed to the first NB with the control-plane signaling path homed instead to the second NB.

13. The method of claim 9, wherein the reconfigured service further retains the configured second access bearer homed to the second NB.

14. The method of claim 9, wherein the core network is a first core network,
    wherein replacing the control-plane signaling path homed to the first NB with the control-plane signaling path homed instead to the second NB comprises replacing the control-plane signaling path homed to the first NB in the first core network with a control-plane signaling path homed instead to the second NB in a second core network, and
    wherein the reconfiguring further comprises replacing the second access bearer homed to the second NB in the first core network with a second access bearer homed to the second NB instead in the second core network.

15. The method of claim 9, wherein the reconfiguring service of the UE from being dual-connectivity service provided concurrently by the first NB and the second NB to instead being single-connectivity service provided by the second NB is additionally responsive to detecting by the first NB that quality of the second air-interface connection between the UE and the second NB is threshold high.

16. The method of claim 15, wherein detecting by the first NB that quality of the second air-interface connection between the UE and the second NB is threshold high comprises receiving by the first NB from the second NB, over an inter-NB interface, an indication of the threshold high quality of the second air-interface connection.

17. The method of claim 9, wherein in the configured dual-connectivity service of the UE, the first NB serves the UE in accordance with a first radio access technology, and the second NB serves the UE in accordance with a second radio access technology different than the first radio access technology.

18. A first Node-B (NB) configured to control service of a user equipment device (UE), the first NB comprising:
    a wireless communication interface through which the first NB is configured to provide air-interface service;
    a network communication interface though which the first NB is configured to communicate on a core network; and
    a controller for controlling the service of the UE, wherein the controller is configured to cause the first NB to carry out operations comprising:
        detecting that, when (i) the first NB is providing service to the UE over a first air-interface connection concurrently with a second NB providing service to the UE over a second air-interface connection and (ii) a control-plane signaling path cooperatively for the first NB's service of the UE and the second NB's service of the UE is homed to the first NB in the core network, quality of the first air-interface connection over which the first NB provides service to the UE is threshold poor, and
        responsive to at least the detecting, signaling over the control-plane signaling path to a core-network control node to trigger replacement of the control-plane signaling path homed to the first NB with a control-plane signaling path instead homed to the second NB.

19. The first NB of claim 18,
    wherein when the first NB is providing service to the UE over a first air-interface connection concurrently with a second NB providing service to the UE over a second air-interface connection, a first access bearer for the UE is homed to the first NB in the core network and a second access bearer for the UE is homed to the second NB in the core network, and wherein the signaling over the control-plane signaling path to the core-network control node also triggers teardown of the first access bearer homed to the first NB in the core network.

20. The first NB of claim 18, wherein the signaling over the control-plane signaling path is additionally responsive to the first NB detecting that, when the quality of the first air-interface connection over which the first NB provides service to the UE is threshold poor, quality of the second air-interface connection over which the second NB provides service to the UE is threshold high.

* * * * *